US009375687B2

(12) United States Patent
Shao et al.

(10) Patent No.: US 9,375,687 B2
(45) Date of Patent: Jun. 28, 2016

(54) ENVIRONMENTALLY-FRIENDLY PASTE DISCHARGE AGENT FOR TEXTILE PRINTING AND PREPARATION METHOD THEREOF

(71) Applicant: ZHEJIANG SCI-TECH UNIVERSITY, Zhejiang (CN)

(72) Inventors: Jianzhong Shao, Zhejiang (CN); Lan Zhou, Zhejiang (CN); Yani Chen, Zhejiang (CN); Dongming Qi, Zhejiang (CN); Jinqiang Liu, Zhejiang (CN)

(73) Assignee: ZHEJIANG SCI-TECH UNIVERSITY, Hangzhou, Zhejiang (CN)

( * ) Notice: Subject to any disclaimer, the term of this patent is extended or adjusted under 35 U.S.C. 154(b) by 219 days.

(21) Appl. No.: 13/992,853

(22) PCT Filed: Dec. 10, 2012

(86) PCT No.: PCT/CN2012/086254
§ 371 (c)(1),
(2) Date: Dec. 18, 2013

(87) PCT Pub. No.: WO2013/174124
PCT Pub. Date: Nov. 28, 2013

(65) Prior Publication Data
US 2014/0148518 A1    May 29, 2014

(30) Foreign Application Priority Data

May 25, 2012    (CN) .......................... 2012 1 0165380

(51) Int. Cl.
| | | |
|---|---|---|
| *B01F 3/12* | (2006.01) | |
| *D06P 5/15* | (2006.01) | |
| *D06P 5/00* | (2006.01) | |
| *B01F 17/54* | (2006.01) | |

(52) U.S. Cl.
CPC ............... *B01F 3/1214* (2013.01); *D06P 5/001* (2013.01); *D06P 5/15* (2013.01); *B01F 17/0071* (2013.01); *B01F 2003/125* (2013.01)

(58) Field of Classification Search
CPC ............. B01F 3/1214; B01F 2003/125; B01F 17/0071; D06P 5/001; D06P 5/15
See application file for complete search history.

(56) References Cited

U.S. PATENT DOCUMENTS

| | | | | |
|---|---|---|---|---|
| 5,846,266 | A | * 12/1998 | Rattee ....................... | D06P 1/62 8/457 |
| 2005/0237369 | A1* | 10/2005 | Kosaka ..................... | D06P 5/30 347/100 |

FOREIGN PATENT DOCUMENTS

| | | | |
|---|---|---|---|
| CN | 101275366 | * | 10/2008 |
| CN | 101538808 | * | 9/2009 |

OTHER PUBLICATIONS

Bell, V.A., et al.; Textile Research Journal, 1983, p. 125-141.*
Provost, J.R.; Review of Progress in Coloration, 1988, p. 29-36.*
Zhou, L., et al.; Advanced Materials Research, 2012, p. 1174-1179.*

* cited by examiner

*Primary Examiner* — Robert Jones, Jr.
(74) *Attorney, Agent, or Firm* — Kratz, Quintos & Hanson, LLP

(57) ABSTRACT

The invention discloses an environmentally-friendly pasty discharge agent for textile printing and a method for preparing the environmentally-friendly pasty discharge agent. The environmentally-friendly pasty discharge agent for textile printing is formed by the following raw materials according to part by weight: decamethylcyclopentasiloxane: 30-60 parts; thiourea dioxide: 40-70 parts; surfactant: 1-3 parts; and glycerol: 3-6 parts. Decamethylcyclopentasiloxane is put into a ball mill, a surfactant is added into the ball mill to make the decamethylcyclopentasiloxane dispersed or dissolved uniformly and then stirred uniformly, and then thiourea dioxide is added into the ball mill and ground together for 1-3 hours. In the invention, the special liquid compound decamethylcyclopentasiloxane does not chemically react with the thiourea dioxide; in addition, it isolates the thiourea dioxide from outside water and air, thus increasing the stability of the thiourea dioxide. The discharge effect is excellent, the defects of low dissolvability, poor dispersion uniformity in the discharge paste, poor net permeability and insufficient discharge effect of the common thiourea dioxide as the discharge agent are overcome, and there is no influence on the touch of the discharged and printed textiles.

5 Claims, No Drawings

US 9,375,687 B2

ENVIRONMENTALLY-FRIENDLY PASTE DISCHARGE AGENT FOR TEXTILE PRINTING AND PREPARATION METHOD THEREOF

TECHNICAL FIELD OF THE INVENTION

The invention relates to a discharge agent for textile discharge printing, in particular to an environmentally-friendly paste discharge agent for textile printing and a preparation method thereof.

BACKGROUND OF THE INVENTION

As a critical chemical agent for implementation of the discharge printing process, the function of a discharge agent is usually to be subjected to a chemical reaction (usually a reduction reaction) with a ground color dye of a printed part during ageing (treatment under certain hygrothermal condition) after printing, so as to damage the chromophoric system of the ground color dye for decoloration.

At present, discharge agents commonly used in the printing and dyeing industry are formaldehyde sulfoxylate type reductants, such as solid rongalite C (sodium formaldehyde sulfoxylate) and decrolin (zinc formaldehyde sulfoxylate), pasty leucotrope H (calcium formaldehyde sulfoxylate) and a liquid discharge agent Rongalit ST Liq. But these discharge agents have the following problems: (1) free formaldehyde is released, printed products cannot meet the requirement of ecological textiles, particularly in the pigment discharge printing, it is more difficult to remove the residual formaldehyde-contained discharge agent due to the application of a binder, and severe washing largely weakens the meaning of water-free printing for pigment printing; (2) the commonly used discharge agents are easy to dissolve and damage during preparation and storage of discharge paste to cause large consumption of the discharge agents and high cost; and (3) the commonly used discharge agents all contain metal ions, even heavy metal ions, but the synthetic thickeners used during pigment printing are generally not resistant to the (heavy) metal ions, causing the implementation of the pigment discharge printing process difficult.

Thiourea dioxide, also called thiourea dioxide with molecular formula of $(NH_2)_2CSO_2$, is stable at room temperature with neither oxidability nor reducibility, and dissolves and separates sulfoxylate with strong reducibility when heated or in alkaline conditions. And meanwhile, the thiourea dioxide does not release formaldehyde and does not contain heavy metal ions, so it is an environmentally-friendly chemical medicine. In conclusion, by using the thiourea dioxide as the discharge agent for discharge printing, the above three problems which exist in formaldehyde sulfoxylate type reductants commonly used in printing and dyeing mills can be solved. However, during practical production and practice, the thiourea dioxide also has some problems when used as the discharge agent for printing: (1) under normal conditions, the thiourea dioxide is white and odorless crystalline grain with low solubility (the solubility is only 26.7 g/L in water at the temperature of 20° C.), and the discharge paste for discharge printing consumes a small amount of water during preparation, as a result, the thiourea dioxide used as the discharge agent during discharge printing cannot be fully dissolved and uniformly dispersed in the discharge paste, instead, it exists in the paste non-uniformly in the form of granular crystal, so the net permeability of the thiourea dioxide and the reduction effectiveness to the ground color dye of the printed part are affected; and, (2) in order to make the discharge agent thiourea dioxide better dissolved and dispersed in the discharge paste, the thiourea dioxide may be mechanically ground in advance. Researches show that, compared with a dry grinding process, the discharge agent thiourea dioxide has smaller particle, better dispersibility and better discharge effect after subjected to wet grinding by using water as medium. However, during the storage of the discharge agent thiourea dioxide subjected to wet grinding, the thiourea dioxide is easy to dissolve and is low in stability due to absorption of and contact to oxygen in air (oxygen may be dissolved in water). The above problems greatly restrain the popularization and application of the thiourea dioxide in printing and dyeing enterprises as discharge agent for printing.

SUMMARY OF THE INVENTION

In view of the problems in the background of the invention, the invention aims at providing an environmentally-friendly pasty discharge agent for textile printing and a method for preparing the environmentally-friendly pasty discharge agent.

The following technical solution is employed by the invention.

1. An environmentally-friendly pasty discharge agent is formed by the following raw materials according to part by weight:
    decamethylcyclopentasiloxane (i.e., D5): 30-60 parts;
    thiourea dioxide: 40-70 parts;
    surfactant: 1-3 parts; and
    glycerol: 3-6 parts.
2. A method for preparing the environmentally-friendly pasty discharge agent:
    30-60 parts of decamethylcyclopentasiloxane, 40-70 parts of thiourea dioxide, 1-3 parts of surfactant and 3-6 parts of glycerol are used;
    1) at normal temperature, 30-60 parts of decamethylcyclopentasiloxane as a dispersion medium is put into a ball mill;
    2) meanwhile, 3-6 parts of glycerol and 1-3 parts of surfactant are added into the ball mill and stirred to be dispersed or dissolved uniformly; and
    3) 40-70 parts of thiourea dioxide is added, stirred and ground together for 1-3 hours, and then mechanically ground and physically modified until a white paste containing fine particles of thiourea dioxide is obtained.

The surfactant is any one of, or combination of two of, or combination of all three of simethicone 100 cs, polyoxyethylene sorbitan fatty acid ester and oleic acid.

The ball mill has a rotation speed of 400-600 rpm.

The fine particles of thiourea dioxide have an average particle size of 20-40 microns.

The invention has that the following advantages:

1. The thiourea dioxide severing for discharging in the invention has an average particle size of 20-40 microns after ground and modified, and decamethylcyclopentasiloxane and dispersant are added during grinding to increase the grinding efficiency, so that the dispersibility and particle fineness of the thiourea dioxide are improved, the defects of low dissolvability, poor dispersion uniformity in the discharge paste, and poor net permeability of the thiourea dioxide are overcome, the discharging and printing performance of the thiourea dioxide as a formaldehyde-free discharge agent is greatly improved to replace the formaldehyde sulfoxylate type reductants commonly used in the printing and dyeing industry at present, and the problems such as release of free formaldehyde during the conventional discharging and printing can be solved.

2. The dispersion medium of the invention is a decamethylcyclopentasiloxane system with a proper proportion, totally free from water. The decamethylcyclopentasiloxane is a special odorless, transparent and low-viscosity liquid compound with Si—O bond as the main chain. Confirmed by literatures, in atmosphere, as a kind of substance harmless to the ozone sphere, decamethylcyclopentasiloxane survives for a short period in air and will be dissolved soon. In soil, decamethylcyclopentasiloxane will be completely dissolved into harmless substances such as inorganic salt, water and carb on dioxide within one week. Therefore, decamethylcyclopentasiloxane is environmentally friendly to atmosphere and water resource.

3. The decamethylcyclopentasiloxane used as the dispersion medium for grinding the thiourea dioxide in the invention does not chemically react with the thiourea dioxide, in addition, it isolates the thiourea dioxide from outside water and air, protecting the thiourea dioxide and obviously increasing the storage stability of the thiourea dioxide ground into micro or nano fineness; furthermore, during baking after printing, the dispersion medium decamethylcyclopentasiloxane volatilizes, without any influence on the touch of the discharged and printed textiles.

4. As containing glycerol, the environmentally-friendly pasty discharge agent for printing provided in the invention has good hygroscopicity, facilitating a paste film to swell due to absorption of moisture to further facilitate the dissolution of the thiourea dioxide. The hygroscopicity of the glycerol also facilitates fibers to swell due to absorption of moisture to thereby facilitate the discharge agent to enter inside the fibers, so the discharge effect is improved.

DETAILED DESCRIPTION OF THE INVENTION

The invention will be further described as bellows with embodiments.

Embodiment 1

The pasty discharge agent is formed by the following raw materials according to part by weight:
  decamethylcyclopentasiloxane: 30 parts;
  thiourea dioxide: 70 parts;
  oleic acid: 2 parts; and
  glycerol: 6 parts.
The pasty discharge agent is prepared by the following method:
  1) at normal temperature, 30 parts of decamethylcyclopentasiloxane as a dispersion medium is put into a ball mill;
  2) meanwhile, 6 parts of glycerol and 2 parts of oleic acid are added into the ball mill and stirred to be dispersed or dissolved uniformly; and
  3) 70 parts of thiourea dioxide is added, stirred and ground together for 1 hour at 600 rpm, and then mechanically ground and physically modified until a white paste A containing fine particles of thiourea dioxide is obtained.

Embodiment 2

The pasty discharge agent is formed by the following raw materials according to part by weight:
  decamethylcyclopentasiloxane: 40 parts;
  thiourea dioxide: 60 parts;
  polyoxyethylene sorbitan fatty acid ester (Tween20): 1 part; and
  glycerol: 5 parts.
The pasty discharge agent is prepared by the following method:
  1) at normal temperature, 40 parts of decamethylcyclopentasiloxane as a dispersion medium is put into a ball mill;
  2) meanwhile, 5 parts of glycerol and 1 parts of polyoxyethylene sorbitan fatty acid ester (Tween20) are added into the ball mill and stirred to be dispersed or dissolved uniformly; and
  3) 60 parts of thiourea dioxide is added, stirred and ground together for 2 hours at 500 rpm, and then mechanically ground and physically modified until a white paste B containing fine particles of thiourea dioxide is obtained.

Embodiment 3

The pasty discharge agent is formed by the following raw materials according to part by weight:
  decamethylcyclopentasiloxane: 50 parts;
  thiourea dioxide: 50 parts;
  dimethylsilicone oil 100 cs: 1.5 parts; and
  glycerol: 4 parts.
The pasty discharge agent is prepared by the following method:
  1) at normal temperature, 50 parts of decamethylcyclopentasiloxane as a dispersion medium is put into a ball mill;
  2) meanwhile, 4 parts of glycerol and 1.5 parts of dimethylsilicone oil 100 cs are added into the ball mill and stirred to be dispersed or dissolved uniformly; and
  3) 50 parts of thiourea dioxide is added, stirred and ground together for 3 hours at 400 rpm, and then mechanically ground and physically modified until a white paste C containing fine particles of thiourea dioxide is obtained.

Embodiment 4

The pasty discharge agent is formed by the following raw materials according to part by weight:
  decamethylcyclopentasiloxane: 50 parts;
  thiourea dioxide: 50 parts;
  dimethylsilicone oil 100 cs: 1.5 parts;
  oleic acid: 1.5 parts; and
  glycerol: 4 parts.
The pasty discharge agent is prepared by the following method:
  1) at normal temperature, 50 parts of decamethylcyclopentasiloxane as a dispersion medium is put into a ball mill;
  2) meanwhile, a surfactant formed of 4 parts of glycerol, 1.5 parts of dimethylsilicone oil 100 cs and 1.5 parts of oleic acid is added into the ball mill and stirred to be dispersed or dissolved uniformly; and
  3) 50 parts of thiourea dioxide is added, stirred and ground together for 1.5 hours at 600 rpm, and then mechanically ground and physically modified until a white paste D containing fine particles of thiourea dioxide is obtained.

Embodiment 5

The pasty discharge agent is formed by the following raw materials according to part by weight:
  decamethylcyclopentasiloxane: 30 parts;
  thiourea dioxide: 70 parts;
  dimethylsilicone oil 100 cs: 1 part;
  polyoxyethylene sorbitan fatty acid ester (Tween20): 1 part; and
  glycerol: 3 parts.
The pasty discharge agent is prepared by the following method:
  1) at normal temperature, 30 parts of decamethylcyclopentasiloxane as a dispersion medium is put into a ball mill;
  2) meanwhile, a surfactant formed of 3 parts of glycerol, 1 part of dimethylsilicone oil 100 cs and 1 part of polyoxyethylene sorbitan fatty acid ester (Tween20) is added into the ball mill and stirred to be dispersed or dissolved uniformly; and
  3) 70 parts of thiourea dioxide is added, stirred and ground together for 2.5 hours at 500 rpm, and then mechanically ground and physically modified until a white paste E containing fine particles of thiourea dioxide is obtained.

Embodiment 6

The pasty discharge agent is formed by the following raw materials according to part by weight:
decamethylcyclopentasiloxane: 40 parts;
thiourea dioxide: 60 parts;
oleic acid: 1 part;
polyoxyethylene sorbitan fatty acid ester (Tween20): 1 part; and
glycerol: 3 parts.

The pasty discharge agent is prepared by the following method:

1) at normal temperature, 40 parts of decamethylcyclopentasiloxane as a dispersion medium is put into a ball mill;
2) meanwhile, a surfactant formed of 3 parts of glycerol, 1 part of oleic acid and 1 part of polyoxyethylene sorbitan fatty acid ester (Tween20) is added into the ball mill and stirred to be dispersed or dissolved uniformly; and
3) 60 parts of thiourea dioxide is added, stirred and ground together for 1 hour at 600 rpm, and then mechanically ground and physically modified until a white paste F containing fine particles of thiourea dioxide is obtained.

Embodiment 7

The pasty discharge agent is formed by the following raw materials according to part by weight:
decamethylcyclopentasiloxane: 50 parts;
thiourea dioxide: 40 parts; dimethylsilicone oil 100 cs: 1 part;
oleic acid: 1 part;
polyoxyethylene sorbitan fatty acid ester (Tween20): 1 part; and
glycerol: 3 parts.

The pasty discharge agent is prepared by the following method:

1) at normal temperature, 50 parts of decamethylcyclopentasiloxane as a dispersion medium is put into a ball mill;
2) meanwhile, a surfactant formed of 3 parts of glycerol, 1 part of dimethylsilicone oil 100 cs, 1 part of polyoxyethylene sorbitan fatty acid ester (Tween20) and 1 part of oleic acid is added into the ball mill and stirred to be dispersed or dissolved uniformly; and
3) 40 parts of thiourea dioxide is added, stirred and ground together for 1 hour at 500 rpm, and then mechanically ground and physically modified until a white paste G containing fine particles of thiourea dioxide is obtained.

The environmentally-friendly pasty discharge agent prepared in Embodiments 1 to 7 is subjected to a particle size test, as shown in Table 1:

TABLE 1

|  | d (0.5) | d (0.9) | Average particle size (μm) |
| --- | --- | --- | --- |
| Thiourea dioxide not ground | 306.78 | 510.90 | 303.67 |
| Embodiment 1 | 33.06 | 54.79 | 34.39 |
| Embodiment 2 | 27.26 | 59.43 | 31.84 |
| Embodiment 3 | 23.21 | 50.31 | 22.50 |
| Embodiment 4 | 17.38 | 36.67 | 20.04 |
| Embodiment 5 | 21.87 | 45.94 | 25.18 |
| Embodiment 6 | 18.44 | 43.61 | 27.18 |
| Embodiment 7 | 33.18 | 54.21 | 39.80 |

Note:
d (0.5) and d (0.9) refer to particle size distribution; $d_{0.5}$ means that 50% of the particle sizes in the discharge agent system is within the range; and $d_{0.9}$ means that 90% of the particle sizes in the discharge agent system is within the range.

As can be seen from Table 1, compared with that of the thiourea dioxide not ground, the average particle size of the environmentally-friendly pasty discharge agent prepared in Embodiments 1 to 7 is obviously reduced, which is beneficial for realizing uniform dispersion of the discharge agent in the discharge paste; and the discharge agent has good net permeability.

The environmentally-friendly pasty discharge agent prepared by the invention is used for white discharge printing according to the following process flow and formula.

The process flow: textile dyeing→size mixing→printing→baking (40° C.-50° C.)→steaming (temperature: 100° C.-105° C.; humidity: 95%-100%; time: 5-10 min)→washing with water.

The formula of the white discharge paste: 10 wt % of environmentally-friendly pasty discharge agent, 5 wt % of urea, and 85 wt % of plant seed glue type thickening paste or composite thickening paste PT-RV/PFL. The composite thickening paste is mixed and prepared from a thickening paste which contains 3% of synthetic thickening agent PT-RV and a thickening paste which contains 3.5% of synthetic thickening agent PEL according to a mass ratio of 1:1 (note: the synthetic thickening agent PT-RV and the synthetic thickening agent PEL are produced by Ciba Specialty Chemicals Co., Ltd. and Shanghai Yuhui Chemicals Co., Ltd., respectively).

The environmentally-friendly pasty discharge agent prepared in Embodiments 1 to 7 is placed for 100 days and sampled every 10 days, a textile is subjected to the white discharge printing according to the foregoing formula and process flow to observe the stability of the discharge agent, which is evaluated by the variation of whiteness value of the textile. The results are shown in Table 2:

TABLE 2

| Days for test | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| 1 day | 61.47 | 59.92 | 58.2 | 60.36 | 58.98 | 59.89 | 58.34 |
| 10 days | 60.53 | 59.42 | 60.41 | 60.03 | 60.82 | 62.08 | 60.51 |
| 20 days | 59.45 | 62.49 | 59.11 | 60.06 | 60.53 | 56.93 | 59.23 |
| 30 days | 62.28 | 62.57 | 57.05 | 61.29 | 58.81 | 59.77 | 57.23 |
| 40 days | 61.55 | 57.47 | 59.62 | 57.04 | 59.83 | 60.73 | 59.73 |
| 50 days | 58.49 | 60.73 | 58.12 | 60.36 | 5822 | 58.75 | 58.34 |
| 60 days | 57.79 | 55.5 | 56.8 | 60.31 | 60.67 | 57.11 | 56.92 |
| 70 days | 61.16 | 58.46 | 61.45 | 60.53 | 60.64 | 56.53 | 61.52 |
| 80 days | 59.1 | 57.7 | 56.76 | 60.49 | 56.98 | 57.69 | 56.86 |
| 90 days | 58.14 | 59.83 | 60.91 | 60.43 | 61.70 | 56.27 | 60.71 |
| 100 days | 60.82 | 56.68 | 58.46 | 61.34 | 59.51 | 58.47 | 58.23 |

Note:
The ground color dye is faintly acid purplish blue VLG (produced by Wenzhou Lesi Dye Co., Ltd.); and the whiteness value is blue ray whiteness.

As can be seen from Table 2, the environmentally-friendly pasty discharge agent prepared in Embodiments 1 to 7 has good storage stability and small influence on the white discharge effect of the ground color dye after long-term storage.

The environmentally-friendly pasty discharge agent prepared in Embodiments 1 to 7 is used for white discharge printing for a textile according to the foregoing white discharge formula and process flow, the printing effect is comprehensively evaluated by the whiteness value and the softness. The results are shown in Table 3.

TABLE 3

| | Not dyed silk textile | | | | | | | | | |
|---|---|---|---|---|---|---|---|---|---|---|
| | Not steamed and washed with water | Steamed and washed with water | Dyed | Embodiment 1 | Embodiment 2 | Embodiment 3 | Embodiment 4 | Embodiment 5 | Embodiment 6 | Embodiment 7 |
| Whiteness value | 77.6 | 76.8 | — | 66.02 | 69.73 | 67.81 | 67.10 | 69.92 | 68.54 | 67.89 |
| Softness | 12.23 | 12.04 | 12.38 | 11.50 | 11.42 | 11.40 | 11.85 | 11.86 | 11.92 | 11.52 |

Note:
The softness test is performed on a PhabrOmeter intelligent textile assurance tester.

As can be seen from Table 3, by comparing silk textile not dyed and dyed silk textile, the softness of the white discharged textile is not obviously affected; and compared with that of silk textile not dyed, the whiteness value of the white discharged textile can fully meet the requirements of costume and the discharge printing process.

The pigment, discharging and printing processes applying the environmentally-friendly pasty discharge agent prepared by the invention are as follows:

textile dyeing→size mixing→printing→baking (40° C.-50° C.)→steaming (temperature: 100° C.-105° C.; humidity: 95%-100%; time: 5-10 min)→baking (the temperature and the time depend on the film-forming property of the binder).

The formula of the pigment discharge printing paste: 2 wt % of pigment, 10 wt % of environmentally-friendly pasty discharge agent, 5 wt % of urea, and 63 wt % of composite thickening paste PT-RV/PFL, and 20 wt % of binder APF101 (note: the binder APF101 is produced by Shanghai Yuhui Chemicals Co., Ltd.).

The environmentally-friendly pasty discharge agent prepared in Embodiments 1 to 7 is used for the pigment discharge of dyed textile according to the foregoing pigment discharge printing formula and process flow, the printing effect is evaluated by the maximum absorption wavelength ($\lambda_{max}$), apparent color depth K/S value and softness of the printed textile. The results are shown in Table 4.

The maximum absorption wavelength ($\lambda_{max}$) of the discharged textile is the same as that of the directly printed textile, it is indicated that the environmentally-friendly pasty discharge agent has a good discharge effect to the ground color, without influence on the shade of the colored pigment; and, in the aspect of the K/S value, the apparent color depth of the discharged textile is slightly shallower than the directly printed textile, but still can meet the requirements of the costume and the pigment discharge printing process.

The invention claimed is:

1. An environmentally-friendly pasty discharge agent for textile printing, formed by the following raw materials according to part by weight:
   decamethylcyclopentasiloxane: 30-60 parts;
   thiourea dioxide: 40-70 parts;
   surfactant: 1-3 parts; and
   glycerol: 3-6 parts.

2. A preparation method for the environmentally-friendly pasty discharge agent for textile printing according to claim 1 comprises the following steps:
   1) 30-60 parts of decamethylcyclopentasiloxane as a dispersion medium is put into a ball mill;
   2) meanwhile, 3-6 parts of glycerol and 1-3 parts of surfactant are added into the ball mill and stirred to be dispersed or dissolved uniformly; and

TABLE 4

| | Silk textile | Direct pigment printing on white silk textile | Pigment discharge printing on dyed silk textile | | | | | | |
|---|---|---|---|---|---|---|---|---|---|
| | not dyed | | Embodiment 1 | Embodiment 2 | Embodiment 3 | Embodiment 4 | Embodiment 5 | Embodiment 6 | Embodiment 7 |
| K/S value | — | 10.47 | 9.01 | 9.38 | 9.04 | 8.74 | 9.54 | 9.74 | 9.68 |
| $\lambda_{max}$ | — | 440 | 440 | 440 | 440 | 440 | 440 | 440 | 440 |
| Softness | 11.37 | 11.89 | 11.50 | 11.42 | 11.40 | 11.85 | 11.86 | 11.92 | 11.84 |

Note:
(1) The ground color is green obtained by matching of faintly acid yellow N-CTL and faintly acid blue 6B; the colored pigment is Yellow K-RC of DyStar Imperon series; and the binder is APF101 produced by Shanghai Yuhui Chemicals Co., Ltd.
(2) The test of the maximum absorption wavelength ($\lambda_{max}$) and the K/S value is performed on an SF600X colorimeter; and, the softness test is performed on a PhabrOmeter intelligent textile style assurance tester.

As can be seen from Table 4, the environmentally-friendly pasty discharge agent prepared in Embodiments 1 to 7 is used for the pigment discharge printing according to the foregoing formula and process flow. Compared with that of silk textile not dyed, the softness of the discharged textile is increased slightly; and, compared with the directly printed textile, the softness of the discharged textile does not change obviously.

3) 40-70 parts of thiourea dioxide is added, stirred and ground together for 1-3 hours, and then mechanically ground and physically modified until a white paste containing fine particles of thiourea dioxide is obtained.

3. The method for preparing the environmentally-friendly pasty discharge agent for textile printing according to claim 2, wherein 1) the surfactant is any one of, or combination of two of, or combination of all three of simethicone having a viscosity of 100 cs, polyoxyethylene sorbitan fatty acid ester and oleic acid; 2) decamethylcyclopentasiloxane does not react with thiourea dioxide, and can isolate thiourea dioxide from oxygen and moisture.

4. The method for preparing the environmentally-friendly pasty discharge agent for textile printing according to claim 2, wherein the ball mill has a rotation speed of 400-600 rpm to finely grind and disperse thiourea dioxide in decamethylcyclopentasiloxane and the surfactant.

5. The method for preparing the environmentally-friendly pasty discharge agent for textile printing according to claim 2, wherein the fine particles of thiourea dioxide have an average particle size of 20-40 microns to disperse in decamethylcyclopentasiloxane and the surfactants.

* * * * *